United States Patent
Moretto

(10) Patent No.: US 8,412,383 B2
(45) Date of Patent: Apr. 2, 2013

(54) METHOD AND APPARATUS FOR DEHUMIDIFYING GRANULAR MATERIAL

(75) Inventor: Renato Moretto, Padua (IT)

(73) Assignee: Moretto S.p.A., Massanzago, Padua (IT)

( * ) Notice: Subject to any disclaimer, the term of this patent is extended or adjusted under 35 U.S.C. 154(b) by 509 days.

(21) Appl. No.: 12/711,761

(22) Filed: Feb. 24, 2010

(65) Prior Publication Data

US 2010/0217445 A1 Aug. 26, 2010

(30) Foreign Application Priority Data

Feb. 25, 2009 (IT) .............................. PD2009A0028

(51) Int. Cl.
- G05D 7/00 (2006.01)
- F26B 21/12 (2006.01)
- F26B 21/08 (2006.01)
- F26B 17/12 (2006.01)

(52) U.S. Cl. .............. 700/282; 700/208; 34/80; 34/168; 34/473

(58) Field of Classification Search .................. 700/282, 700/208; 34/80, 168, 169, 473, 487, 569, 34/570

See application file for complete search history.

(56) References Cited

U.S. PATENT DOCUMENTS

| | | | |
|---|---|---|---|
| 4,127,395 A | 11/1978 | McKey et al. | |
| 4,413,426 A | 11/1983 | Graff | |
| 5,896,675 A * | 4/1999 | Holler et al. | 34/548 |
| 7,188,434 B2 | 3/2007 | Moretto | |
| 2007/0199203 A1* | 8/2007 | Federico | 34/416 |
| 2008/0295354 A1* | 12/2008 | Moretto | 34/80 |

FOREIGN PATENT DOCUMENTS

| | | | |
|---|---|---|---|
| DE | 3412173 A1 * | 10/1985 | |
| DE | 19719483 A1 * | 11/1998 | |
| EP | 1914496 | 4/2008 | |
| EP | 2020581 | 2/2009 | |
| GB | 1533559 | 11/1978 | |

* cited by examiner

Primary Examiner — Jeffrey A Gaffin
Assistant Examiner — Steven Garland
(74) Attorney, Agent, or Firm — Shoemaker and Mattare

(57) ABSTRACT

Granular material is dehumidified by: a) providing a number of dry air generators inside hoppers containing granular material; b) for each dry air generator, evaluating the dry air flow generable and/or higher energy efficiency functioning time; c) calculating the dry air flow rate for each single hopper depending on the characteristics of the granular material; and d) activating a number of generators sufficient to deliver a total dry air flow rate equal to the sum of the flow rates required by the hoppers. The number of the generators and the generators to be activated are chosen depending on the flow rate deliverable by each and/or by their respective ranges of functioning at higher energy efficiency according to an energy saving logic. The remaining generators are deactivated.

14 Claims, 5 Drawing Sheets

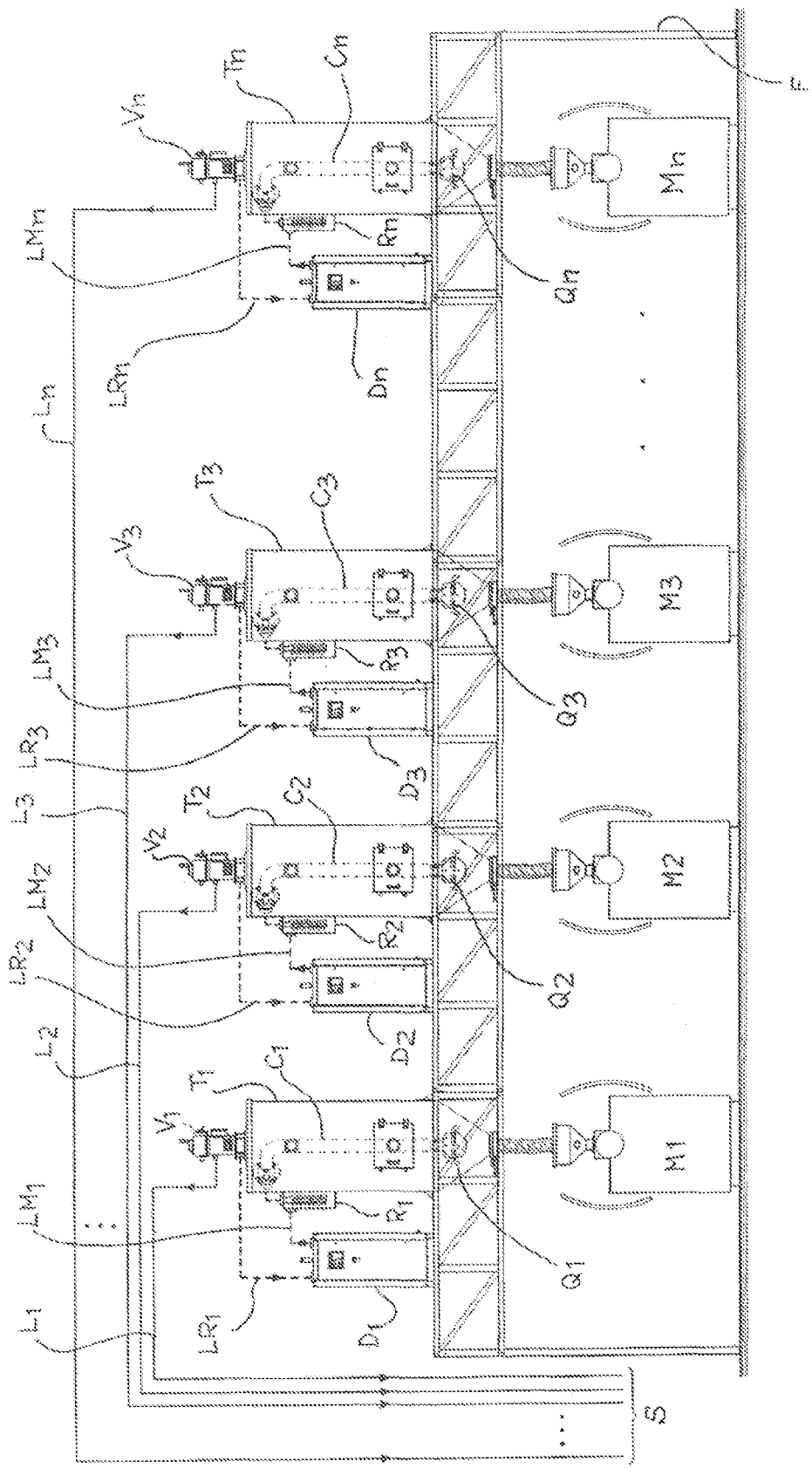
Fig. 5 (traditional)

METHOD AND APPARATUS FOR DEHUMIDIFYING GRANULAR MATERIAL

FIELD OF APPLICATION

The present invention relates to a dehumidification method of materials in granular form and plant thereof, in particular for granular materials composed of one or more plastic materials.

STATE OF THE ART

In the processing of plastic materials, the dehumidification treatment of plastic material granules performed before fusion is of particular importance.

As is known, on account of their hygroscopicity, plastic materials in granular form contain molecules of water. During the fusion step the molecules of water may insinuate themselves in the molecular chains of the polymers. This causes the presence of surface defects, bubbles and lack of structural and colour homogeneity in the final products, to the detriment of the quality of the same.

Many dehumidification plants of granular plastic materials exist on the market. The most common involve the use of adsorbent means, such as molecular sieves.

As is known, at room temperature molecular sieves have the specific property of adsorbing almost all the humidity from the air around them or which strikes them. At much higher temperatures however they behave in the completely opposite manner thereby releasing into the (hot) air which strikes them, the molecules of water captured therein.

These properties are exploited to generate dry air in dehumidification plants. The room air is made to pass through the adsorbent means contained in a vessel for the purpose, called in jargon as a "tower". The air thus dehumidified is heated and then made to pass through the granular material to be dehumidified generally contained in the feed hoppers of processing machines (for example presses). The granular material, struck by the flow of hot, dry air gradually yields up its water content. The flow of dry air is normally in the opposite direction to the flow of granular material which is fed to the machine from the hopper.

The duration of the dehumidification process of the granular material depends on many factors, some of which related to the characteristics of the granular material, such as density, granulometry, polymeric composition, and to other characteristics of the dehumidification plants and operating requirements of the processing machines.

The adsorbent means used up to today have a limited adsorption capacity. This influences the operative autonomy of the plant. The use of a single tower with adsorbent means enforces discontinuous functioning. In fact the process must be interrupted at regular intervals for the regeneration of the adsorbent means (by desorption of the water). The frequency and length of such interruptions depends on the flow rates of treated air and degree of utilisation of the adsorbent means envisaged for each cycle.

To overcome such limitation more recent dehumidification plants normally envisage two towers of adsorbent means, connected to each other in parallel to an air distribution circuit and set so as to alternate with each other in regeneration and operating steps.

As is known, dehumidification plants of granular materials may be single hopper or "multi-hopper".

In the dehumidification plants known as "multi-hopper", the hygroscopic granular material is contained inside several hoppers, which can be installed in a fixed position (generally near the processing machines) or mounted on mobile trolleys, so as to be more easily and rapidly fed depending on the specific processing requirements.

In FIG. 5 attached hereto, a multi-hopper dehumidification plant of the traditional type is shown, comprising a plurality of hoppers T1, T2, T3, . . . , Tn, each served by an independent air treatment system.

The hoppers are placed on a support structure F. Each hopper is placed over the respective processing machine (press) M1, M2, M3, . . . , Mn for the moulding of the item to be produced. Each single hopper has its own generating device of hot, dry air (in the jargon "dryer") D1, D2, D3, . . . , Dn, composed of two towers filled with adsorbent means (not shown in the Figure) and provided with at least one blower (not shown in the Figure).

Each hopper is internally provided with an air intake duct C1, C2, C3, . . . , Cn fluidically connected at one end to the respective dryer and at the opposite end to a diffuser cone Q1, Q2, Q3 , , . . . , Qn, positioned in the lower part of the hopper itself. The diffuser has a plurality of holes, through which the hot and dry air is fed into the hopper and diffused in a multiplicity of directions so as to strike and thereby dehumidify all the granular material contained inside the hopper. The flow of air is countercurrent on respect of the flow of granular material coming out of the hopper, to ensure the highest possible degree of dehumidification to the material about to be processed.

The granular material is loaded into the top of each hopper through a collector V1, V2, V3, . . . , Vn, connected by a vacuum line L1, L2, L3, . . . , Ln to the various storage silos of the material.

The dehumidified air emitted from the dryer enters the intake duct C1, C2, C3, . . . , Cn of each hopper through a delivery duct LM1, LM2, LM3, . . . , LMn, passing through a heating device R1, R2, R3, . . . , Rn, suitable for heating the dry air to the desired temperature.

The air thus made hot and dry is diffused throughout the granular material to be treated, which yields up most of its water content to the process air. The (humid) air exits from the hopper flowing into a return duct LR1, LR2, LR3, . . . , LRn to be once again conveyed into the dryer.

Dehumidification plants of the type described above permit a continuous dehumidification process ensuring excellent results in terms of quality of the final product.

The main limitation of these plants is in their limited capacity to adapt to the operating requirements of the processing machines as regards variations both in the hourly production rate, and in the type of plastic material processed. This negatively affects the energy efficiency of the system, especially in operating conditions of under-utilisation of the machines.

The entire air distribution system, but in particular the individual dry air generator, is normally designed (in terms of the number and size of the blowers, size of the towers and of the pipes) for the maximum hourly production of the machine served and for the type of plastic material mainly processed by such machine.

In operating conditions of under-utilisation of the machines the flow rate of dry air to the hopper needs to be appropriately reduced to prevent detrimental overheating of the granular material remaining in the hopper for a longer time.

To such purpose part of the flow generated by the blowers can be short-circuited so as to reduce the flow rate of circulating air.

Below certain hourly production rates, despite the functionality of the processing machine continuing to be fully guaranteed, the energy efficiency of the system falls significantly. In fact, despite the reduced hourly production rate the energy consumption required to dehumidify the process air and regenerate the adsorbent means remains substantially unaltered.

This limitation has been partially overcome by providing systems for varying the speed of the blowers (for example by means of inverters). In this way significant reductions of energy consumption can be achieved to the advantage of system efficiency. In some operating conditions however, the blowers find themselves operating in conditions far from the ideal design conditions and therefore with poor efficiency.

In any case, by varying the flow rate of dry air delivered, fluid dynamic conditions very different from those envisaged (for example inside the adsorbent means) may arise in the generators. This contributes to reducing the efficiency of the system.

A similar situation to that described above arises in the (increasingly frequent) case of using the machine to process different types of plastic products.

As is known, the flow rate of air to the hopper may vary significantly as the type of plastic material being processed varies. For some plastic materials the system may therefore work in conditions of low energy efficiency regardless of the hourly production rate.

Similar problems are also found in "multi hopper" dehumidification plants with a single dry air generator shared by all the hoppers.

An example of this type of system is described in the U.S. Pat. No. 4,413,426.

More in detail, the system envisages a closed dry air distribution circuit to which a plurality of hoppers are connected in parallel. The dry air generator which feeds the circuit comprises a plurality of towers (with adsorbent means) connected in parallel to a common supply line and a common return line of the distribution circuit. In turn one of the towers undergoes regeneration. To such purpose the system has a movement device which in rotation brings each tower to connect to a secondary regeneration circuit, fluidically disconnected from the main air distribution circuit. Operatively, depending on the settings in the project step, one tower is in the regeneration step and the remainder are operative. In this case too, as the dehumidification requirements of the hoppers vary, the air flow rate can be regulated by short-circuiting part of the air flow to the dryer and/or adjusting the speed of the blower.

PRESENTATION OF THE INVENTION

Consequently, the purpose of the present invention is to eliminate the drawbacks of the prior art described above, by providing a dehumidification method for materials in granular form, which allows high energy efficiency to be maintained at varying operating conditions.

A further purpose of the present invention is to provide a dehumidification method for materials in granular form, which allows treatment of plastic materials having very different physical-chemical characteristics without losing energy efficiency.

A further purpose of the present invention is to provide a dehumidification method for plastic materials in granular form which has a high energy efficiency with the varying of the operating conditions.

A further purpose of the present invention is to provide a dehumidification method for granular plastic materials which is easy and cheap to realise.

BRIEF DESCRIPTION OF THE DIAGRAMS

The technical characteristics of the invention, according to the aforesaid purposes, can be clearly seen from the content of the claims shown below and the advantages of the same will be even more evident from the detailed description which follows, made with reference to the attached figures, which show one or more non-limiting embodiments merely by way of example, wherein:

FIG. 5 shows a traditional multi-hopper dehumification plant.

DETAILED DESCRIPTION

Figure 1:
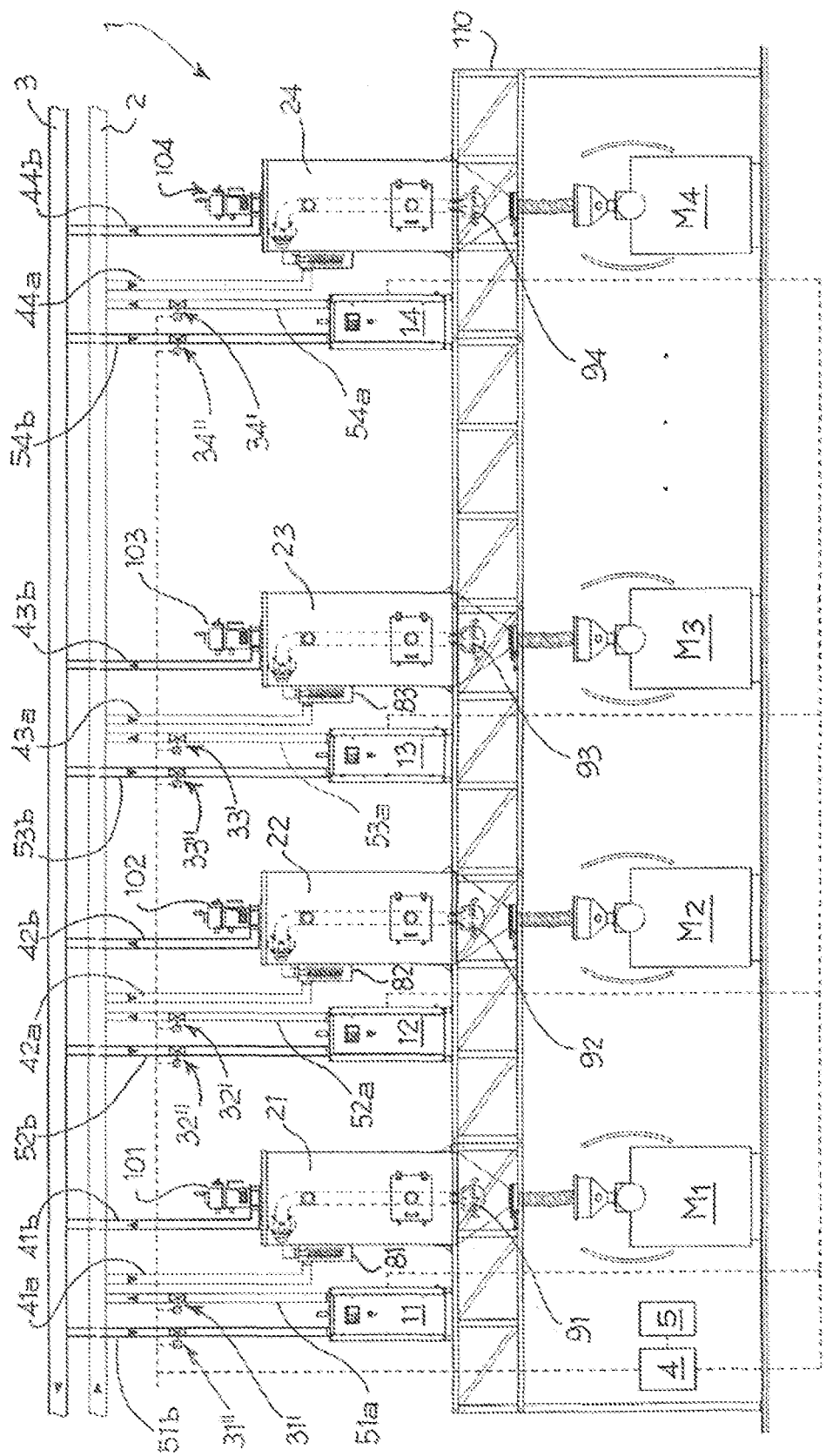
FIG. 1 shows a diagram of a dehumidification plant made according to a first embodiment of the invention.

The present invention concerns both a method and plant for the dehumidification of materials in granular form, in particular plastic granular materials.

The term "granular" is taken to generally include materials of any shape, for example in the form of granules, powder or flakes.

For the sake of simplicity, the plant will be described first and then the dehumidification method according to the invention.

The plant according to the present invention is globally denoted by reference numeral 1 in the attached figures.

According to a general embodiment of the invention, the dehumidification plant 1 comprises:
- an air distribution circuit comprising at least one common supply line 2 and one common return line 3;
- a plurality of dry air generators 11, 12, 13, 14 connected in parallel to the two common supply and return lines 2, 3;
- one or more hoppers 21, 22, 23, 24 connected in parallel to said common lines 2, 3 and suitable for containing granular material (in particular plastic material) to be dehumidified before being fed into processing machines M; and
- an electronic management and control unit 4 of the plant 1.

The plant 1 comprises downstream and upstream of each generator 11, 12, 13, 14 a first 31', 32', 33', 34' and a second valve 31", 32", 33", 34" respectively which can be automatically controlled by the aforesaid management and control unit 4 to fluidically exclude or connect the generator 11, 12, 13, 14 to the air distribution circuit.

Unlike the solutions of the prior art, the plant does not envisage a single dry air generator dimensioned to satisfy the flow rate peaks of dry air, but a plurality of generators (envisaged in an adequate number for the design potential of the plant) which can be activated in a variable number by the electronic unit depending on the operating capacity of each and on the effective dry air flow rate requirements of the hoppers, according to an energy saving logic.

As will be explained in detail further on in the description, compared to the solutions of the prior art the plant 1 is more flexible and easier to adapt to flow variations dictated not just by variations in the hourly production rate, but also by variations in the type of granular material to be dehumidified.

Preferably, the dry air generators 11, 12, 13, 14 are of the type comprising adsorbent means, for example molecular sieves. Each dry air generator is of the type known in the jargon as "single tower", in other words provided with a single containment chamber of adsorbent means. As will be explained further below, the use of "single tower" generators makes it possible to simplify the functioning of the plant, with advantages both in terms of control and of energy consumption.

However, dry air generators of the type with two or more towers having adsorbent means, alternating with each other in regeneration and operating steps, may also be used.

Advantageously, in both cases the plant 1 comprises for each generator a regeneration circuit of the adsorbent means 10 which will be described in detail below.

Operatively, the single tower of a generator undergoes regeneration when the adsorbent capacities fall below certain preset levels and/or after a preset operating time.

The adsorbent capacities can essentially be evaluated by measuring the relative humidity of a flow of air exiting the adsorbent means.

Figure 2:
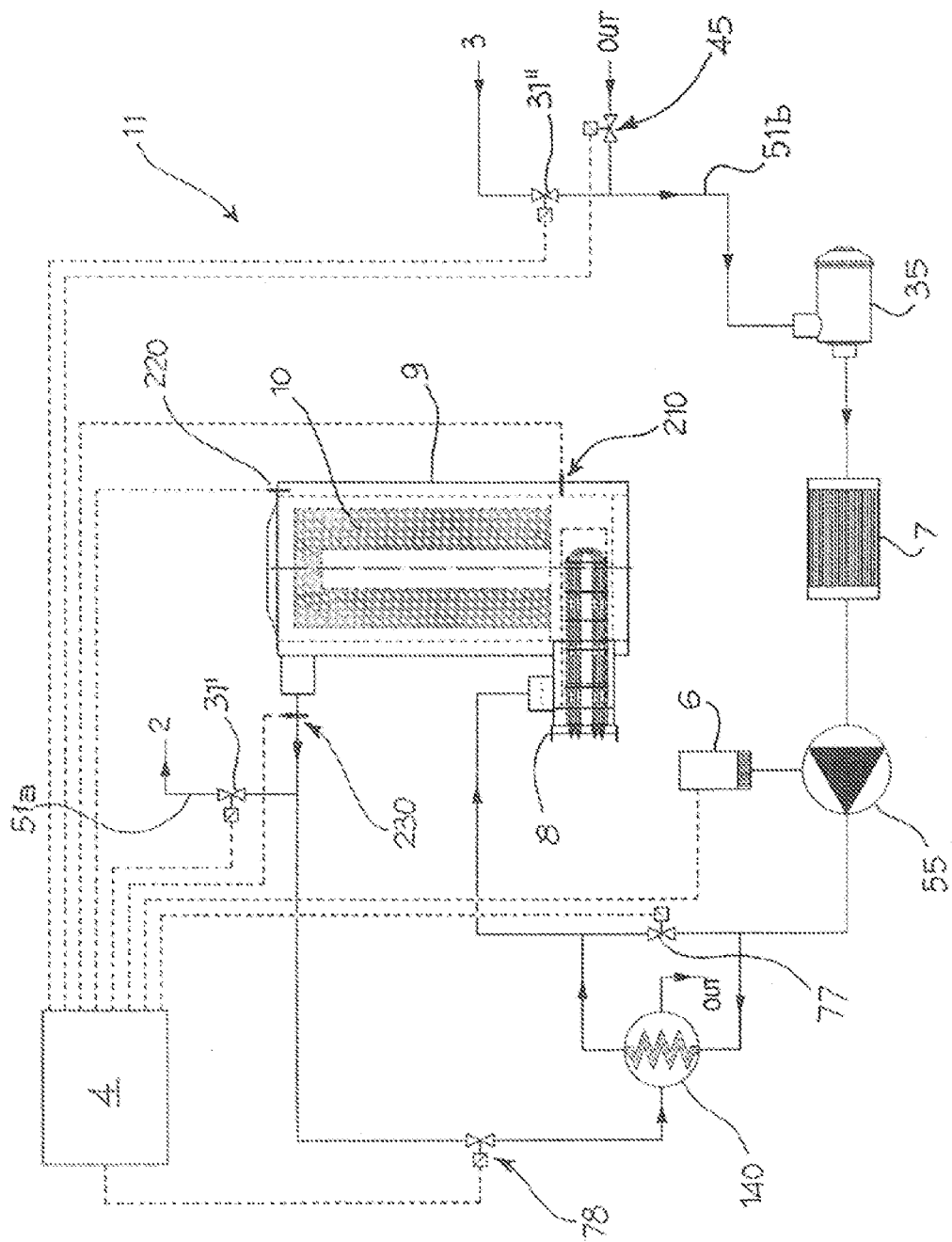
FIG. 2 shows a diagram of a detail of a plant made according to the invention, relative to a dry air generator.

Advantageously, as shown in particular in FIG. 2, to such purpose, the plant 1 according to the invention comprises for each generator 11, 12, 13, 14 detecting means 230 of the humidity of the air exiting the adsorbent means 10 therein contained.

Preferably, such detecting means 230 are composed of a hygrometer which supplies the dewpoint temperature. In fact, the dewpoint is defined as the temperature at which, at constant pressure, the air (or, more specifically, the air-vapour mixture) becomes saturated with water vapour, and is obviously associated with the relative humidity of the air flow.

Functionally, the detecting means 230 are electrically connected to the electronic unit 4, so that the status of the adsorbent means of each tower can be monitored by the aforesaid electronic unit 4. The choice of which and how many generators to activate is also made on the basis of the respective adsorbent capacities.

Preferably, the generators are identical in terms of potential so as to simplify not just maintenance, but also management and control. However, plants having different generators may also be envisaged.

Each generator is provided with ventilating means 55 able to generate a flow of air through the adsorbent means. Preferably such means are composed of one or more blowers 55.

Advantageously, the ventilating means 55 are controlled by the aforesaid electronic unit 4 to regulate the flow rate of air delivered by the generator, for example by means of an inverter 6 connected to the motor of the blower 55.

As will be described further below, regulation of the flow rate delivered by the individual generators active (i.e. the generators fluidically connected to the air distribution circuit) is also performed in relation to the operating capacity of each generator and the effective dry air flow requirements of the hoppers, according to an energy saving logic.

According to a preferred control scheme of the plant, once the value of the dry air flow rate required by the hoppers has been acquired, the activatable generators are identified and the number activated is chosen according to the ideal functioning range (project) of each generator. Subsequent variations in the value of the total dry air flow rate required are dealt with by regulating the flow rates delivered by the single generators active, when the flow rates fall within the ideal functioning ranges, or (if possible) by varying the number of generators activated and/or changing the specific generators running, when the flow rates do not fall within the ideal functioning ranges.

As already indicated, the electronic unit 4 regulates the total flow rate of dry air delivered in relation to the requirements of each hopper.

Advantageously, the plant 1 comprises a system for regulating the flows in input to the individual hoppers on the basis of the characteristics of the granular material contained therein.

Preferably, such regulation system, which will be described in detail below, comprises at least one control valve 61', 62', 63', 64' controllable by the electronic unit 4 in the air intake duct of each hopper and downstream of this valve measuring means of the flow rate 150 electrically connected to the same electronic unit 4.

Operatively, the electronic unit 4 implements an algorithm to calculate the flow rate of dry air A1, A2, A3, A4 required by each hopper. Such algorithm requires input data relative to the characteristics of the granular material contained in each hopper (such as for example granulometry, specific weight, degree of humidity). Said data are preferably inserted by means of a user interface 5 connected to the aforesaid electronic unit 4.

According to a preferred embodiment of the invention, illustrated in FIG. 1, the dehumidification plant 1 comprises a multiplicity of hoppers 21, 22, 23, 24 suitable for containing granular materials (not shown in the Figure) which may have different chemical-physical properties (such as granulometry, specific weight, degree of humidity) and different process requirements (for example, length of time in hopper).

The hoppers, which may even be of different sizes, are positioned each at the respective processing machine M1, M2, M3, M4 (for example a moulding machine) by means of a fixed support structure 110.

Alternative solutions may be foreseen with several hoppers serving the same machine, or several machines fed from the same hopper.

More specifically, from the discharge outlets of each hopper 21, 22, 23, 24 a duct extends (in the case illustrated, of the flexible type), through which the granular material (dehumidified inside the hopper) enters the respective machine where it is destined to be transformed into the desired product.

Each hopper has a collector on the top 102, 103, 104 for loading the granular material. Each collector is connected by a vacuum line (not shown) to the various storage silos of the material (not shown).

Next to each hopper, a dry air generator device 11, 12, 13, 14, is positioned, preferably of the "single tower" adsorbent means type, which will be described in detail below.

Alternatively, each generator may also be of the type with two or more adsorbent means towers.

The number of generators is not necessarily the same as the number of hoppers.

As will be described in more detail below, each generator is provided with ventilating means 55 (not shown in FIG. 1) suitable for generating a flow rate of air through the adsorbent means, to be sent to the inside of the hoppers after being dehumidified.

The air distribution circuit comprises a common delivery line 2 and a common return line 3. From the common delivery line 2 a plurality of air intake ducts 41a, 42a, 43a, 44a depart to the hoppers, while a plurality of air output ducts 41b, 42b, 43b, 44b lead in to the common return line 3 from the hoppers. The hoppers 21, 22, 23, 24 are therefore connected in parallel between the two common ducts.

More specifically, each intake duct 41a, 42a, 43a, 44a terminates inside the respective hopper in a cone diffuser 91, 92, 93, 94 positioned in the lower part of the said hopper. The diffuser has a plurality of holes, through which the dry (and hot) air is emitted into the hopper and diffused in a multiplicity of directions so as to strike and thereby dehumidify all the granular material contained inside the hopper. The air flow is countercurrent on respect of the flow of granular material exiting the hopper, to ensure the maximum degree of dehumidification possible of the material about to be processed.

In each intake duct 41a, 42a, 43a, 44a there is a heating unit 81, 82, 83, 84, preferably outside the hopper, suitable for raising the intake air to the temperature required by the granular material contained in the hopper.

Each generator 11, 12, 13, 14 is connected to the common delivery line 2 by a delivery duct 51a, 52a, 53a, 54a and to the common return line 3 by a return duct 51b, 52b, 53b, 54b. The delivery duct and the return duct are respectively intercepted by a first valve 31', 32', 33', 34' and by a second valve 31", 32", 33", 34", which can be automatically controlled by the aforesaid electronic unit 4 to fluidically exclude or connect the generator 11, 12, 13, 14 to the air distribution circuit.

Operatively, the dry air (dehumidified) generated by the activated (functioning and fluidically connected to the air distribution circuit) generators flows into the common delivery line 2 through the delivery ducts 51a, 52a, 53a, 54a. From the common delivery line 2 the total flow rate of dry air is divided among all the hoppers 21, 22, 23, 24 after passing through the respective heating units 81, 82, 83, 84. Once inside the respective hopper the process air filters through the plastic material in granules contained therein, removing the water molecules present in the granules. Subsequently the (humid) air exits each hopper passing through the exit ducts 41b, 42b, 43b, 44b to return to the generators via the common return line 3.

Advantageously, the dehumidification plant 1 according to the present invention has a user interface 5, which may comprise a video unit and data input means, typically a keypad and a mouse. Preferably the user interface 5 is a graphic object interface of the touch-screen type, also placed near the dehumidification plant.

According to the embodiment just described and illustrated in FIG. 1 the dry air generators are positioned near the hoppers and thus near the processing machines. This situation may arise, for example, in the case in which the plant 1 according to the invention is made by modernising a traditional type plant envisaging for each hopper an independent dehumidification system with relative dry air generator. In this case, as already said, the generators are preferably positioned on a fixed support structure near the respective hoppers.

Figure 3:
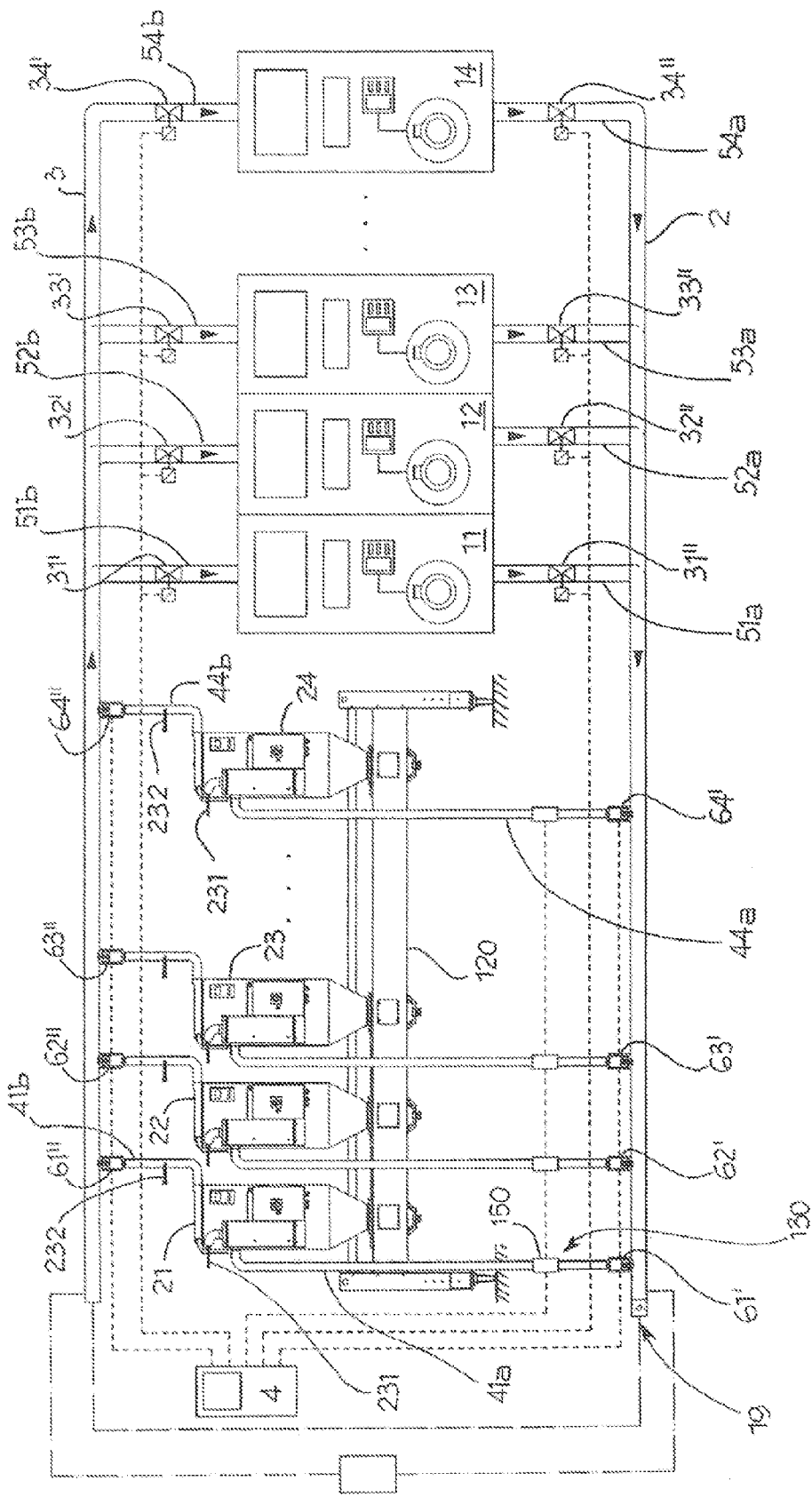
FIG. 3 shows a diagram of a dehumidification plant made according to a second embodiment of the invention.

According to an alternative embodiment schematically illustrated in FIG. 3, it is possible to envisage a dehumidification plant 1 according to the invention with the generators concentrated in a dedicated area of the plant, spatially separate from the hoppers and from the processing machines. The hoppers 21, 22, 23, 24 may be situated in a fixed support structure (of the type shown in FIG. 1) or, advantageously, may be situated on a mobile trolley 120, as shown in FIG. 3.

In the plant 1 shown in FIG. 3, the elements in common with the plant shown in FIG. 1 have the same numerical indication.

The dehumidification plant 1 shown in FIG. 3 has a regulation system 130 of the air flows into the hoppers, which will be described separately below.

Advantageously, the plant 1 shown in FIG. 3 has a safety system composed of a non-return valve 19 situated on the common delivery line 2 and communicating with the outside environment. In the case of excess total air, connected for example with a functioning anomaly not regulated by the system, once a predefined overpressure value has been exceeded, such valve 19 opens, permitting the external blow-off of the excess flow.

The general functioning of the dehumidification plant 1 according to the invention will now be described.

Initially, the plant 1 is configured by an operator using the graphic interface 5 to memorise in the electronic management and control unit 4—for each single hopper—the characteristics of the granular material contained therein and/or the hourly production rate of the respective machine and/or the size of the hopper itself.

Subsequently, the electronic control unit 4 calculates the specific process air flow rate for each single hopper using a specific algorithm, so as to adequately dehumidify the material contained inside it.

Once the flow rates required by each single hopper have been calculated, the control unit 4 decides—by applying an energy saving logic—which dry air generators to activate on the basis of their respective ideal functioning ranges, evaluating in particular, the maximum air flow rate deliverable (related to the characteristics of the ventilating means) and the adsorption capacity for each tower and/or the period of time for which the tower is remained active in the previous operating cycle.

Depending on the sum of the flows required by the hoppers, the electronic control unit 4 thus defines the number of generators and which specific generators to activate (i.e. fluidically connect to the distribution circuit). To such purpose the control unit sends a signal to the generators 21, 22, 23, 24 and respective valves 31, 32, 33, 34, controlling their opening or closing.

Assuming that at a preset hourly production rate the overall requirement of the hoppers is met, when fully operational, by n generators (identical to each other) out of a total number of n+m, the electronic control unit will activate n generators, choosing from those with the greatest adsorbent capacity and/or which were active in the previous cycle (before regeneration) for a period of time corresponding to a preset value (set in the calculation algorithm). The electronic unit 4 will then turn on the n generators by opening the respective valves, in case these valves were closed during the deactivation step. The remaining m generators not activated for dehumidification treatment will either go into regeneration or remain inactive, depending on the respective adsorbent capacity measured (dewpoint reading) and/or the value of the period of running time in the previous cycle. Preferably, the valves of the deactivated generators will be closed. As will be resumed further below, it is not necessary that in the deactivation step the generators are excluded from fluidic connection with the distribution circuit.

If there are no variations in the input data, such as hourly production rate, type of materials, number of hoppers, etc, the ratio of the number n of active generators and the number m of generators in regeneration and off will remain constant during functioning of the plant 1.

As a result, when one or more generators pass from the process step to that of regeneration, the electronic unit 4 will activate an equivalent number of generators, chosen from those which are off and/or in regeneration, by simultaneously opening and closing the respective valves.

In the case of modification of the input data, connected for example with variations in the hourly production rate, type of granular material being processed and/or number of hoppers (temporary exclusion of one or more hoppers from the plant for maintenance purposes) the electronic control unit 4 will proceed to regulate as required the total flow rate delivered by the generators.

If the flow variations can be absorbed within the ideal functioning ranges of the generators running, the control unit 4 will directly regulate the flow rates of each generator, preferably by varying the rotation speed of the blowers, for example using an inverter, of any suitable type.

If, rather, the flow variations cannot be absorbed within the ideal functioning ranges of the generators running, the control unit 4 will send a new signal to the generators and to the respective valves so as to change the ratio between the number of active generators and the number of generators which are off or in regeneration.

The modes of intervention will be the same in the case in which the number of generators available should decrease as a result of maintenance of one or more of the same.

With reference to FIG. 2, a dry air generator and relative regeneration circuit will now be described in detail according to a preferred embodiment of the invention.

The dry air generator, globally indicated by reference numeral 11, comprises a single container 9, called in jargon "single dehumidification tower", defining within it a containment chamber of adsorbent means 10, such as for example molecular sieves, of any suitable type.

The single dehumidification tower 9 may be of any suitable type, for example having a coaxial structure as described in the U.S. Pat. No. 7,188,434 filed in the name of the same applicant and herein incorporated for reference.

The air enters the single tower 9 through a return duct 51*b* connected to the common return line 3 through the second valve already mentioned 31". Downstream of such second valve 31" an external air intake duct branches off, intercepted by a third valve 45. Along the aforesaid intake duct the air passes, in sequence, a filter 35, a cooling unit 7, ventilating means 55 and a heating unit 8. Between the ventilating means 55 and the heating unit 8, the intake duct is intercepted by a fourth valve 77 with a by-pass in which heat exchange means 140 are inserted.

The heating unit 8, placed preferably at the base of the aforesaid tower 9, is typically constituted of an electric resistance.

The ventilating means (of pressurisation or air pumping) are composed, for example, of one or more blowers 55, provided with means of varying the speed of rotation 6 of any suitable type, preferably of the electronic type, for example an inverter of any suitable type, such being destined to vary the power supply frequency to the motor of the blower 55, so as to modulate the air flow rate in the process step.

The (dehumidified) air exits the single tower 9 through a delivery duct 51*a* connected to the common delivery line 2 by means of the first valve 31' mentioned. Upstream of such first valve 31', the delivery duct has a branch which is intercepted by a fifth valve 78 and which passes through the aforesaid heat exchange means 140 before coming out into the external environment.

When the generator 11 is activated (in the process step), the five valves just mentioned (controlled by the electronic control unit 4) are in the following state: second valve 31" open; third valve 45 closed; fourth valve 77 open; fifth valve 78 closed; first valve 31' open.

The air coming from the return line 3, humid after having passed through the granular material in the hoppers, passes through the second valve 31", in this case open, the filter 35, the cooler 7, predisposed to lower the temperature of the return air so that the adsorbent means 10 can absorb the water molecules contained in the gas or air passing through them. The air is then conveyed, by the ventilating means (pressurisation or air pumping) 55 into the single tower, by means of the fourth by-pass valve 77 (open) and the heating unit 8 (off). After passing through the molecular sieves contained inside the single tower, the dehumidified air flows into the common delivery line 2 through the first valve 31".

Once the adsorbent means of the tower 9 are saturated, the control unit 4 puts the generator into the regeneration step, altering the status of the five valves indicated above: second valve 31" closed; third valve 45 open; fourth valve 77 closed; fifth valve 78 open; first valve 31' closed.

The blower 55 aspirates air from the atmosphere through the third valve 45. The air goes through the filter 35, the cooler unit 4 (which in this case does not lower the temperature further) and the heat exchange means 140 (cross flow exchanger) for energy optimisation. The air then goes through the heating unit 8 (which in this case will be on) and, then through the adsorbent means 10, which will yield up the molecules of water trapped inside them to the air going through. The air loaded with humidity exits the tower 9 and then passes through the fifth valve 78 (open) and the heat exchanger 140 (where it gives off heat to the incoming cold air, pre-heating it) to then finally be expelled to the outside atmosphere.

Preferably, the generator 11 is provided with a first temperature probe 210 placed at the lower portion of the tower 9. Such first probe 210 is predisposed to send an electric signal to the control unit 4. On the basis of such signal the control unit 4 can regulate the operating temperature of the heater 8 by means of a heat regulation device (not shown in the figure) and/or regulate the flow rate of regeneration air so as to achieve the preset temperature.

The generator 11 comprises in addition a sensor 230 of relative humidity of the process air, generally a hygrometer, which supplies the dewpoint. On the basis of such signal the control unit 4 decides whether the generator 11 should pass into the regeneration step or not.

Operatively, when regeneration is complete, the tower 9 must be cooled to restore the operative conditions of dehumidification of the adsorbent means. In this step the molecular sieves 10 are at too high a temperature to absorb humidity.

For energy optimisation, the cooling step will follow the procedure envisaged for the process step except for the fact that in this case the intake air flow rate will be regulated on the basis of a specific algorithm and/or on the basis of the temperature measured by a second temperature probe 220 placed at the top of the tower.

At the beginning of the cooling step, the sieves will be able to absorb molecules of water from the air coming from the common return line 3. Consequently the flow rate of air will initially be minimal to then gradually increase as the temperature of the sieves contained in the tower, falls.

In the cooling step the flow rate of air will increase with time. At the beginning of this step the air will have a high dewpoint (high relative humidity). Generally this does not create problems since the flow rate of air is limited compared to the flow rate with the tower fully functioning, and is mixed with the process air, fully operational, coming from the remaining active generators.

Alternatively if, during the cooling step, the quality of the air is not as desired, the flow rate of air may be discharged into the environment by opening the fifth valve 78 and closing the first valve 31'.

According to the embodiment illustrated in FIG. 3, the dehumidification plant 1 is provided with a regulation system 130 of the flow rate of each individual hopper.

Advantageously such regulation system 130 may also be adopted in the dehumidification plant according to the embodiment illustrated in FIG. 1.

For simplicity of explanation such regulation system 130 will be described with reference to the single hopper 21.

In a general embodiment, such system 130 comprises a flow meter 150, of any suitable type, and the already mentioned first regulation valve 61', both controlled by the electronic control unit 4.

Preferably, the flow meter is a flow nozzle Venturi meter 150, which has the advantage of combining the characteristics of a flow nozzle with the reduced head loss of a Venturi meter.

Figure 4:
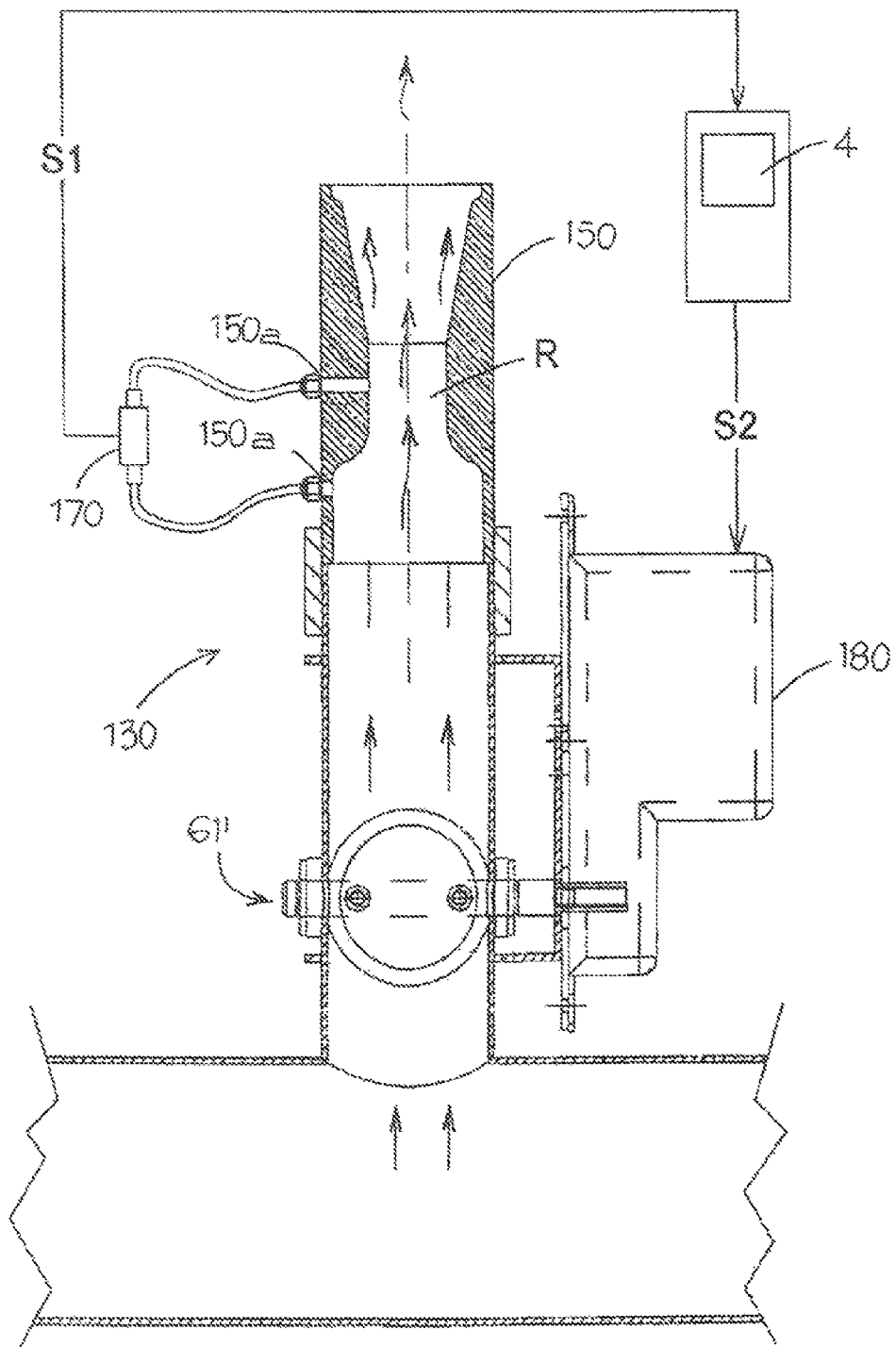
FIG. 4 shows a diagram of a detail of a plant made according to the invention, relative to measurement and regulation means of the air flow rate in input to a hopper.

As shown in detail in FIG. 4, a differential manometer 170 is connected to the flow nozzle Venturi meter 150 by means of two holes 150a made one upstream and one at a bottleneck R. The differential manometer 170 measures the difference in pressure at the holes 150a and transforms it into an electric signal S1 sent in input to the electronic control unit 4.

The first regulation valve 61' is servo-assisted, preferably of the butterfly or ball type, electrically or pneumatically controlled or controlled by a linear or rotating actuator, so as to adopt from two to a multiplicity of different functioning positions. In FIG. 4, the first regulation valve 61' is shown as a butterfly valve controlled by an electrically driven motor 180.

The electric signal S1 received from the electronic control unit 4 is transformed into a corresponding value of "real" flow rate which is compared with a flow rate value calculated for the hopper 21 by the electronic unit 4, for example on the basis of data fed in by a user. On the basis of such comparison, the electronic unit 4 will produce an electric signal in output S2 activating the motor 180 of the first valve 61' to regulate its opening and, if necessary, its closing.

Preferably, the type of control performed by the electronic unit 4 to achieve the correct regulation of the valve 61', is a PID type control (proportional integrative derivative).

Some special modes will now be described for managing the dehumidification treatment of the material contained in the hoppers.

In the initial phase of dehumidification treatment of granular material it may be important for the material inside the hopper to be heated gradually to prevent deleterious heat shock. The latter could lead to unwanted evaporation or sublimation of parts of the materials, especially in the case of plastic polymer materials.

In such situation the electronic control unit 4 may regulate the ventilating means of one or more dry air generators to gradually increase the total circulating air flow rate and thereby the flow rate entering the hopper about to be activated ("Soft-Start function).

Vice versa a rapid increase in flow may be necessary, for example in the case of materials not particularly sensitive to heat shock. In this case the electronic control unit 4 may regulate the ventilating means of one or more dry air generators to suddenly increase the total circulating air flow rate ("Boost" function).

During dehumidification treatment it may be necessary to maintain the temperature of the granular material inside one or more hoppers. In the case in which the amount of granular material collected by a processing machine is below a preset level, the time spent in the hopper increases and the heat gradient between the various levels of material inside the hopper falls. If not adequately controlled this phenomenon could lead to damage of the granular material.

To resolve this problem, the dehumidification plant 1 according to the invention is provided with a first temperature sensor 231 for each hopper positioned at the air intake duct 41a, 42a, 43a, 44a to the hopper 21, 22, 23, 24 and with a second temperature sensor 232 positioned at the air outlet duct 41b, 42b, 43b, 44b from said hopper.

Operatively, the two temperature sensors 231 and 232 respectively measure the temperature of the air going into and leaving each hopper and transmit such measured values to the electronic control unit 4.

The input temperature value is used in particular for the heat regulation of the incoming dry air, with intervention of the heating units 81, 82, 83, 84.

The output temperature value rather is used to assess the heating level of the granular material contained in the hopper, on the basis of preset threshold values. Operatively, the electronic unit 4 compares the values measured with preset threshold values. Should a difference be detected, the electronic unit 4 may command closure of the first regulating valve 61', 62', 63', 64' so as to reduce the passage of air. During the holding step therefore, the hopper finds itself with a temperature stabilised at a value such as not to cause damage to the material contained therein. As the processing machine resumes collecting of material from the hopper, new material enters the hopper from the storage silos and the temperature of the outgoing air falls. The control unit 4 may thus command opening of the first regulation valve so as to increase the passage of air.

Alternatively, the level of heating of the material in the hopper may be measured by considering the difference between the temperature of the incoming air and the outgoing air.

Preferably on the outlet duct, downstream of the second sensor 232, an on-off type valve 61",62",63",64" is inserted, automatic or manual, which can be used in conjunction with the first regulation valve to exclude the single hopper from the distribution circuit, for example during maintenance or to stop processing.

Advantageously, visualisation means (not shown) of the functioning parameters may be provided on each hopper. Warning devices, for example visual or acoustic, may also be provided, to signal any anomalies or malfunctioning.

The dehumidification method according to the invention will now be described.

According to a general application of the invention, a first step a) of the method consists of providing a plurality of dry air generators 11, 12, 13, 14 connected in parallel to a delivery line 2 and a return line 3 for the distribution of air inside one or more hoppers 21, 22, 23, 24 fluidically connected in parallel to said common lines and containing granular material to be dehumidified before being fed to processing machines.

A second step b) of the method consists—for each dry air generator—of estimating the dry air flow rate generated by each (in the case of generators with constant flow) and/or of the higher energy efficiency functioning range in terms of the dry air flow rate generated (in the case of generators with variable flow).

Such range depends on the ideal functioning conditions of the ventilating means and of the adsorbent means.

A third step c) of the method consists of calculating the dry air flow A1, A2, A3, A4 required by each single hopper depending on the characteristics of the granular material contained therein.

A fourth step d) of the method consists of activating a sufficient number of generators to deliver a total flow rate of dry air Atot substantially equal to the sum of the flow rates A1, A2, A3, A4 required by the aforesaid hoppers.

The number of generators activated and which generators to activate is chosen on the basis of the deliverable flow rate of each and/or on their respective functioning ranges according to an energy saving logic for the same total flow rate (Atot) to be delivered.

Again, according to the aforesaid general application of the invention, the method comprises a fifth step e) of deactivating the remaining generators.

Preferably, the activation step d) envisages the fluidic connection of the generators chosen, to the common delivery 2 and return 3 lines, and the deactivation step e) may envisage the exclusion of the generators from the fluidic connection with the delivery and return lines.

With this aim, operatively, the activation d) and deactivation e) steps envisage for each generator the respective opening and closing of a pair of valves, of which the first is positioned upstream and the second downstream of the generator.

Advantageously, the deactivation step e) may envisage turning off one or more non-activated generators.

According to a not preferred form of implementation of the invention, the step e) of deactivation may not envisage the exclusion of the generators to be deactivated from the fluidic connection with the delivery and return lines. For example, in case the generator to be deactivated does not need regeneration, it may be sufficient to turn off the relative ventilation means, then letting the generator and the relative, dedicated circuit reach passively fluidic and pressure equilibrium with the distribution circuit.

According to the invention, the method comprises two regulation steps of the total flow rate Atot:

a regulation step f) performed by varying the air flow rates generated by the generators activated within the aforesaid respective functioning ranges; preferably the flow rate of each single generator being varied by acting on the ventilating means with which it is provided;

a regulation step g) performed by varying the number of generators activated; the activated generators being chosen in relation to their functioning ranges according to the aforesaid energy saving logic.

The two regulation steps f) and g) may be alternative to each other or performed in sequence. In particular, step f) is usually conducted subsequent to step g). However the two steps may also be set to be performed in the reverse order.

Preferably, the method according to the invention is applied using generators provided with a single chamber for containing adsorbent means, of the molecular sieve type. Thanks to the aforesaid ventilating means, the air flow rate delivered by the generator is made to pass through such single chamber.

As already indicated when describing the plant according to the invention, generators with two or more separate chambers containing adsorbent means may however also be used.

Advantageously, during the regulation step g) of the total flow rate of air Atot (performed by varying the number of generators activated) the generators are chosen on the basis of the adsorbent capacities of the aforesaid single containment chamber.

With such aim it is envisaged a step i) of detecting the relative humidity of the flow of air passing through the adsorbent means 10.

Depending on the adsorbent capacity detected, one or more inactivated generators may enter a regeneration step of the adsorbent means 10.

Preferably, the method according to the invention comprises a step l) of regulating the flow rate passing through the single hopper depending on the relative flow rate value A1, A2, A3, An calculated in the aforesaid calculation step c).

Advantageously, the aforesaid regulation step l) envisages measurement of the flow rate passing through said hopper and is conducted by controlling at least a first regulation valve positioned upstream of the hopper along the air distribution line.

Preferably, the dehumidification method according to the invention is implemented automatically by an electronic management and control unit 4.

In this case the method comprises a step m) of feeding into the aforesaid electronic unit data relative to:

the characteristics of the granular materials contained in the hoppers; and/or the characteristics of the generators and the hoppers.

The invention makes it possible to achieve many advantages, in part already described.

Compared to the traditional technical solutions, the invention makes it possible to significantly reduce the energy consumption of dehumidification treatment.

The plant 1 according to the invention is in fact structured so that the number of generators and the generators to be activated may be chosen according to an energy saving logic on the basis of the real operating requirements of the plant.

The generators not activated are either undergoing regeneration or are off, thereby preventing wasteful functioning in vain.

In particular, the generators are basically used in the ideal functioning conditions in which their energy efficiency is maximised.

The plant 1 and the method according to the invention are more flexible and easier to adapt to flow rate variations dictated not just by variations in the hourly production rate, but also by variations in the type of granular material to be dehumidified.

The replacement of a single generator with a number of smaller generators connected in parallel, permits savings in terms of piping. In fact, for the same flow rate, the use of smaller generators connected in parallel permits a reduction of diameter of the piping inside the single generators and of the connection piping to the common delivery and return lines.

The plant and the dehumidification method according to the invention also lends itself to the modernisation of a traditional type plant envisaging an independent dehumidification system for each hopper with relative dry air generator. The dry air generators of the old plant can be used without having to be moved. Work on the old plant need essentially only envisage providing an air distribution circuit with a delivery line and a return line to which the existing generators and hoppers must be connected in parallel.

In this case, as already said, the generators are preferably positioned on a fixed support structure near the respective hoppers.

The invention so conceived thus achieves the objectives set.

Obviously, it may assume in its practical embodiment, shapes and configurations other than those described above, while remaining within the scope of protection.

Moreover all the parts may be replaced with technically equivalent elements and the sizes, shapes and materials used may be of any type required.

The invention claimed is:

1. A method of dehumidifying granular materials, said method comprising the following operating steps:

a) providing a plurality of dry air generators connected in parallel to a supply line and a return line for the distribution of air inside one or more hoppers fluidly connected in parallel to said lines and containing granular material to be dehumidified before being fed into processing machines;

b) for each dry air generator estimating the flow rate of dry air which can be generated and/or a range of functioning at higher energy efficiency in terms of the flow rate of dry air which can be generated;
c) calculating the flow rate of dry air needed for each individual hopper depending on the characteristics of the granular material contained therein;
d) activating a number of generators sufficient to deliver altogether a total flow rate of dry air substantially equal to the sum of the flow rates needed for said one or more hoppers, the number of said generators and the generators to be activated being chosen depending on the flow rate which can be delivered by each of them and/or on their respective ranges of functioning according to an energy saving logic for the same total flow rate to be delivered; and
e) deactivating the remaining generators.

2. Method according to claim 1, wherein said activation step d) comprises the fluidic connection of the chosen generators to said supply and return lines, while said deactivation step e) comprises the exclusion of the generators to be deactivated from fluidic connection with said supply and return lines.

3. Method according to claim 2, wherein said steps of activation d) and deactivation e) comprises for each generator respectively the opening and closing of a pair of valves, of which a first one placed upstream and a second one placed downstream from said generator.

4. Method according to claim 1, wherein said deactivation step e) comprises turning off one or more non-activated generators.

5. Method according to claim 1, comprising a step f) of regulating the total air flow rate by varying the air flow rates generated by the generators activated within the respective ranges of functioning, the flow rate of each single generator being varied by acting on ventilating means with which it is provided.

6. Method according to claim 1, comprising a step g) of regulating the total air flow rate by varying the number of activated generators, said activated generators being chosen in relation to the flow rate deliverable by each of them and/or to their respective ranges of functioning according to said energy saving logic.

7. Method according to claim 1, wherein each generator is provided with a single chamber for containing adsorbent means, through which, by means of ventilating means, the air flow rate delivered by said generator is made to pass.

8. Method according to claim 7, wherein each said chamber has an adsorbent capacity and, regulating the total air flow rate by varying the number of activated generators, choosing said activated generators on the basis of their adsorbent capacities.

9. Method according to claim 7, comprising a step h) of regenerating the adsorbent means of one or more of the deactivated generators.

10. Method according to claim 9, comprising a step I) of detecting the relative humidity of the flow rate of air passing through said adsorbent means.

11. Method according to claim 1, comprising a step 1) of regulating the flow rate passing through a single hopper depending on the relative flow rate value calculated in said calculation step c).

12. Method according to claim 11, wherein said regulation step l) comprises measuring the flow rate passing through said hopper and controlling at least a first regulation valve positioned upstream of said hopper along the air distribution line.

13. Method according to claim 1, wherein the method is automatically implemented by an electronic management and control unit.

14. Method according to claim 13, further comprising a step m) of feeding into said electronic unit data relative to the characteristics of the granular materials contained in said one or more hoppers and/or relative to characteristics of said generators and /or of said one or more hoppers.

* * * * *